(12) United States Patent
Tanaka et al.

(10) Patent No.: US 10,361,034 B2
(45) Date of Patent: Jul. 23, 2019

(54) MULTILAYER CERAMIC CAPACITOR

(71) Applicant: Murata Manufacturing Co., Ltd., Nagaokakyo-shi, Kyoto-fu (JP)

(72) Inventors: Hideaki Tanaka, Nagaokakyo (JP); Daiki Fukunaga, Nagaokakyo (JP); Koji Moriyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/199,546

(22) Filed: Nov. 26, 2018

(65) Prior Publication Data

US 2019/0096586 A1     Mar. 28, 2019

Related U.S. Application Data

(63) Continuation of application No. 15/960,694, filed on Apr. 24, 2018, which is a continuation of application (Continued)

(30) Foreign Application Priority Data

Jul. 17, 2015 (JP) ................. 2015-142975

(51) Int. Cl.
*H01G 4/30* (2006.01)
*H01G 4/005* (2006.01)
(Continued)

(52) U.S. Cl.
CPC ............... *H01G 4/30* (2013.01); *H01G 4/005* (2013.01); *H01G 4/232* (2013.01); *H01G 4/1218* (2013.01)

(58) Field of Classification Search
CPC ........ H01G 4/005; H01G 4/008; H01G 4/012; H01G 4/12; H01G 4/30; H01G 4/248;
(Continued)

(56) References Cited

U.S. PATENT DOCUMENTS 9,812,260 B2  11/2017  Fukunaga et al.
9,812,261 B2  11/2017  Fukunaga et al.
(Continued)

FOREIGN PATENT DOCUMENTS

CN    101930847 A    12/2010
CN    104103422 A    10/2014
(Continued)

OTHER PUBLICATIONS

Tanaka et al., "Multilayer Ceramic Capacitor", U.S. Appl. No. 15/960,694, filed Apr. 24, 2018.
(Continued)

*Primary Examiner* — Nguyen T Ha
(74) *Attorney, Agent, or Firm* — Keating & Bennet, LLP

(57) ABSTRACT

A multilayer ceramic capacitor includes a laminated body and first and second external electrodes respectively on both end surfaces of the laminated body. When regions where first internal electrodes or second internal electrodes are not present are regarded as side margin portions in a cross section of the laminated body as viewed from the laminating direction, the side margin portions include multiple side margin layers, and the content of Si in the side margin layer closest to the internal electrode is lower than that in the side margin layer other than the side margin layer closest to the internal electrode.

21 Claims, 8 Drawing Sheets

Related U.S. Application Data

No. 15/210,933, filed on Jul. 15, 2016, now Pat. No. 9,984,824.

(51) Int. Cl.
 *H01G 4/232* (2006.01)
 *H01G 4/12* (2006.01)

(58) Field of Classification Search
 CPC .. H01G 4/1227; H01G 4/1245; H01G 4/1236; H01H 4/232
 See application file for complete search history.

(56) References Cited

U.S. PATENT DOCUMENTS

| | | | |
|---|---|---|---|
| 2008/0304204 A1 | 12/2008 | Suzuki | |
| 2009/0310276 A1* | 12/2009 | Tashima | H01G 4/012 361/303 |
| 2012/0250221 A1 | 10/2012 | Yamashita | |
| 2013/0208399 A1 | 8/2013 | Morita et al. | |
| 2014/0301014 A1 | 10/2014 | Kim | |
| 2014/0301015 A1* | 10/2014 | Kim | H01G 4/30 361/301.4 |
| 2015/0340156 A1 | 11/2015 | Masunari et al. | |
| 2015/0348712 A1 | 12/2015 | Lee et al. | |

FOREIGN PATENT DOCUMENTS

| | | |
|---|---|---|
| JP | 61-248413 A | 11/1986 |
| JP | 2009-032833 A | 2/2009 |
| JP | 2010-050263 A | 3/2010 |
| JP | 2014-146752 A | 8/2014 |
| JP | 2017-011172 A | 1/2017 |
| KR | 10-2014-0121728 A | 10/2014 |
| WO | 2012/023334 A1 | 2/2012 |

OTHER PUBLICATIONS

Official Communication issued in Japanese Patent Application No. 2015-142975, dated Feb. 26, 2019.
Fukunaga et al., "Multilayer Ceramic Capacitor", U.S. Appl. No. 15/415,986, filed Jan. 26, 2017.
Tanaka et al., "Multilayer Ceramic Capacitor", U.S. Appl. No. 16/285,283, filed Feb. 26, 2019.
Tanaka et al., "Multilayer Ceramic Capacitor", U.S. Appl. No. 16/285,285, filed Feb. 26, 2019.
Tanaka et al., "Multilayer Ceramic Capacitor", U.S. Appl. No. 16/285,286, filed Feb. 26, 2019.
Tanaka et al., "Multilayer Ceramic Capacitor", U.S. Appl. No. 16/285,288, filed Feb. 26, 2019.

* cited by examiner

A-A CROSS-SECTIONAL VIEW

B-B CROSS-SECTIONAL VIEW

ENLARGED VIEW OF PART C

MULTILAYER CERAMIC CAPACITOR

CROSS REFERENCE TO RELATED APPLICATIONS

This application claims the benefit of priority to Japanese Patent Application 2015-142975 filed Jul. 17, 2015, the entire contents of which are hereby incorporated by reference.

BACKGROUND OF THE INVENTION

1. Field of the Invention

The present invention relates to a multilayer ceramic capacitor.

2. Description of the Related Art

In recent years, multilayer ceramic capacitors have been required which are high in capacitance and small in size. Such multilayer ceramic capacitors each have a laminated body formed in a rectangular or substantially rectangular parallelepiped shape, for example, where dielectric layers for inner layers with internal electrodes printed and the internal electrodes are laminated alternately, and furthermore, ceramic layers for outer layers are laminated on the upper surface and lower surface thereof. Further, the capacitors each have external electrodes formed on both end surfaces of the laminated body.

Some of the multilayer ceramic capacitors have dielectric layers referred to as side margin portions, which are formed on side surfaces of the laminated bodies for preventing the internal electrodes from being connected to the external electrodes at the side surfaces.

JP 61-248413 A discloses a method for manufacturing a multilayer ceramic capacitor including such side margin portions as described previously. In the method for manufacturing a multilayer ceramic capacitor as described in JP 61-248413 A, first, ceramic green sheets are stacked which have, on the surfaces thereof, conductive films formed to define and function as internal electrodes. Next, a mother stacked body is formed, and cut such that the conductive films are exposed at side surfaces with no external electrodes formed in cutting the mother stacked body. As a result, a stacked body chip is obtained. Then, ceramic slurry to define and function as the side margin portions is applied to the internal electrodes exposed at both sides of the cut stacked body chip. Thus, it becomes possible to form the internal electrodes over the entire width of the stacked body chip, thus making it possible to increase the efficiency of acquiring the electrostatic capacitance, and to reduce the fluctuation in electrostatic capacitance.

However, the multilayer ceramic capacitor in JP 61-248413 A fails to achieve sufficient strength for the side margin portions, for example, when the thicknesses of the side margin portions, that is, the dimension of the stacked body in the width direction is reduced for the purpose of achieving higher capacitance in a smaller size of multilayer ceramic capacitor. Thus, the multilayer ceramic capacitor in JP 61-248413 A has the problem of failing to achieve sufficient deflecting strength. Moreover, the side margin portions are made more likely to be cracked or chipped, and ingress of water is caused from the cracks or chips. Thus, the multilayer ceramic capacitor in JP 61-248413 A has the problem of decreased insulation properties.

SUMMARY OF THE INVENTION

Preferred embodiments of the present invention provide a multilayer ceramic capacitor which has improved reliability achieved by improving a strength of side margin portions even when the side margin portions have a small dimension in a width direction.

A multilayer ceramic capacitor according to a preferred embodiment of the present invention includes a laminated body including a plurality of dielectric layers laminated and a plurality of internal electrodes; and external electrodes electrically connected to the internal electrodes, wherein the laminated body preferably has a rectangular or substantially rectangular parallelepiped shape including a first principal surface and a second principal surface opposed in the laminating direction, a first side surface and a second side surface opposed in the width direction perpendicular or substantially perpendicular to the laminating direction, and a first end surface and a second end surface opposed in the length direction perpendicular or substantially perpendicular to both the laminating direction and the width direction, the plurality of internal electrodes includes first internal electrodes exposed at the first end surface, and second internal electrodes exposed at the second end surface to be opposed to the first internal electrodes with the dielectric layers interposed therebetween, the plurality of external electrodes includes a first external electrode that covers the first end surface and is electrically connected to the first internal electrodes, and a second external electrode that covers the second end surface and is connected to the second internal electrodes, and when regions where the first internal electrodes or the second internal electrodes are not present are regarded as side margin portions in a cross section of the laminated body as viewed from the laminating direction, the side margin portions include multiple side margin layers, and the content of Si in the side margin layer closest to the internal electrode is lower than that in the side margin layer other than the side margin layer closest to the internal electrode.

In addition, in a multilayer ceramic capacitor according to a preferred embodiment of the present invention, exposed surfaces of the first internal electrodes and the second internal electrodes at the first side surface of the laminated body and the second side surface thereof preferably contain more Si than central portions of the first internal electrodes and the second internal electrodes.

Furthermore, in a multilayer ceramic capacitor according to a preferred embodiment of the present invention, the side margin portions preferably have Si mole number/Ti mole number of about 1.0 or more and about 7.0 or less.

Furthermore, in a multilayer ceramic capacitor according to a preferred embodiment of the present invention, the side margin portions preferably have a dimension of about 5 μm or more and about 40 μm or less in the width direction.

In a multilayer ceramic capacitor according to a preferred embodiment of the present invention, when regions where the first internal electrodes or the second internal electrodes are not present are regarded as the side margin portions in the laminated body as viewed from the laminating direction, the side margin portions have multiple side margin layers, and the content of Si in the side margin layer closest to the internal electrode is lower than that in the side margin layer other than the side margin layer closest to the internal electrode. Thus, the strength of the side margin portions is increased. Thus, the deflecting strength of the multilayer ceramic capacitor is improved. Furthermore, the side margin portions are made less likely to be cracked or chipped, and ingress of water is thus able to be prevented. Thus, insulating properties of the multilayer ceramic capacitor are able to be ensured. As a result, the multilayer ceramic capacitor achieves sufficient reliability.

According to various preferred embodiments of the present invention, a multilayer ceramic capacitor achieves improved reliability by improving the strength of side margin portions even when the side margin portions have a small dimension in the width direction.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9A is a schematic view illustrating ceramic green sheets with conductive films formed, and FIG. 9B is a pattern diagram illustrating the stacked ceramic green sheets with the conductive films formed.

DETAILED DESCRIPTION OF THE PREFERRED EMBODIMENTS

Figure 1:
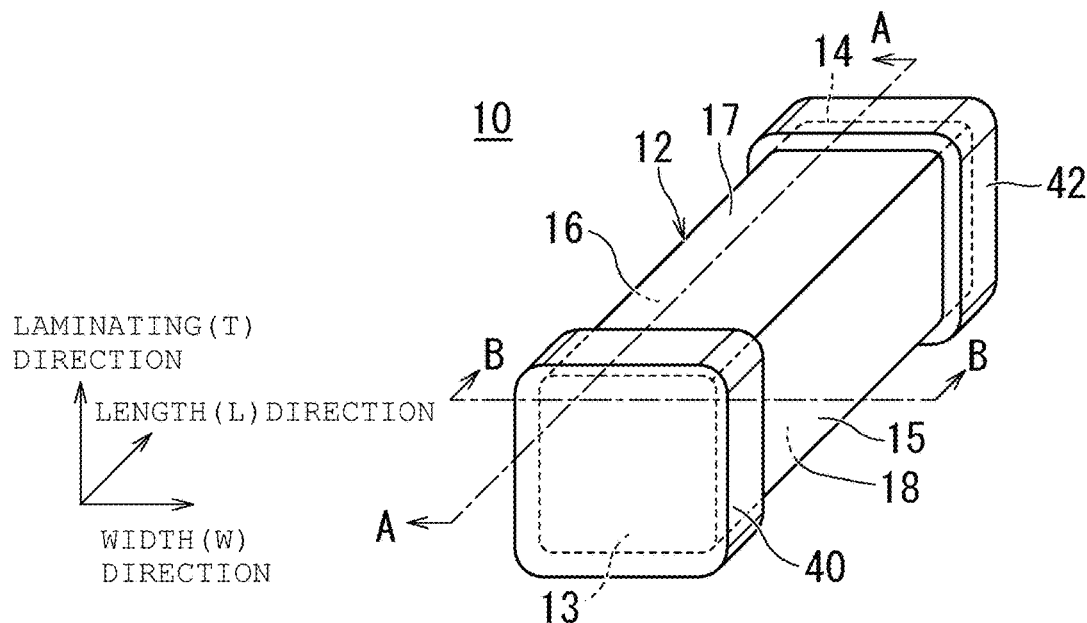
FIG. 1 is an appearance perspective view of a multilayer ceramic capacitor according to a preferred embodiment of the present invention.
Figure 2:
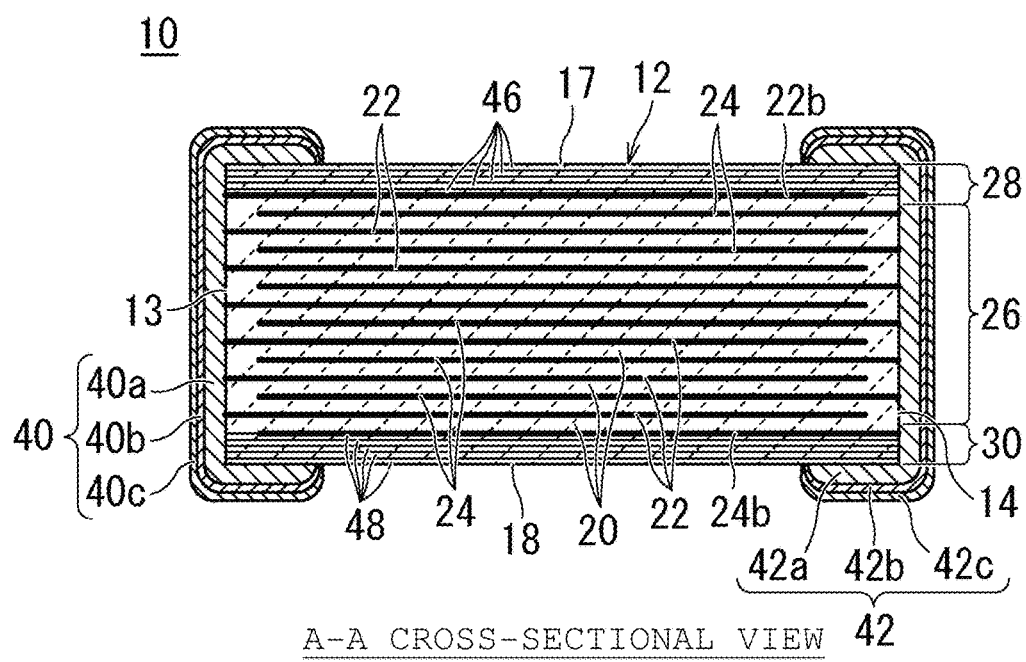
FIG. 2 is a cross-sectional view along the line A-A of FIG. 1, which illustrates a multilayer ceramic capacitor according to a preferred embodiment of the present invention.
Figure 3:
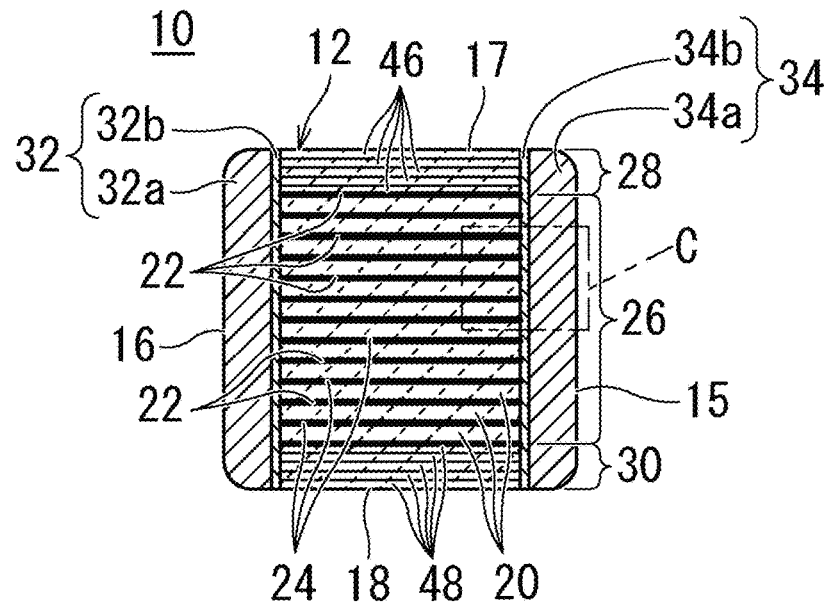
FIG. 3 is a cross-sectional view along the line B-B of FIG. 1, which illustrates a multilayer ceramic capacitor according to a preferred embodiment of the present invention.
Figure 4:
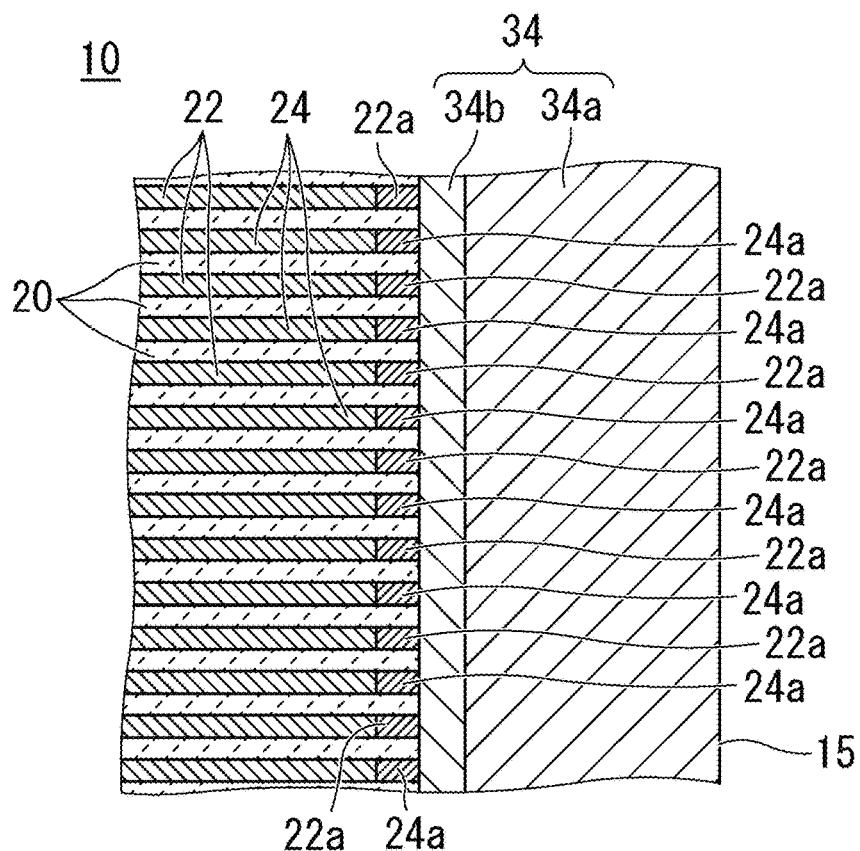
FIG. 4 is an enlarged view of a portion C in FIG. 3, which illustrates a multilayer ceramic capacitor according to a preferred embodiment of the present invention.

A multilayer ceramic capacitor according to a preferred embodiment of the present invention will be described with reference to FIGS. 1 to 4. FIG. 1 is an appearance perspective view illustrating a multilayer ceramic capacitor according to a preferred embodiment of the present invention. FIG. 2 is a cross-sectional view along the line A-A of FIG. 1, which illustrates the multilayer ceramic capacitor according to a preferred embodiment of the present invention. FIG. 3 is a cross-sectional view along the line B-B of FIG. 1, which illustrates the multilayer ceramic capacitor according to a preferred embodiment of the present invention. FIG. 4 is an enlarged view of a portion C in FIG. 3, which illustrates the multilayer ceramic capacitor according to a preferred embodiment of the present invention.

As shown in FIG. 1, the multilayer ceramic capacitor 10 according to this preferred embodiment preferably includes a laminated body 12, and first and second external electrodes 40, 42 provided respectively on both end surfaces of the laminated body 12.

Example sizes of the multilayer ceramic capacitor 10 according to a preferred embodiment of the present invention include approximate sizes such as, for example, "1.6 mm×0.8 mm×0.8 mm", "1.0 mm×0.5 mm×0.5 mm", "0.6 mm×0.3 mm×0.3 mm", "0.4 mm×0.2 mm×0.2 mm", or "0.2 mm×0.1 mm×0.1 mm", when the size is expressed as "the dimension in the length (L) direction×the dimension in the width (W) direction×the dimension in the laminating (T) direction".

As shown in FIG. 1, the laminated body 12 preferably has a rectangular or substantially rectangular parallelepiped shape. The laminated body 12 includes a first end surface 13 and a second end surface 14 extending in the width (W) direction and the laminating (T) direction, a first side surface 15 and a second side surface 16, extending in the length (L) direction and the laminating (T) direction, and a first principal surface 17 and a second principal surface 18 extending in the length (L) direction and the width (W) direction. The first end surface 13 and the second end surface 14 are opposed to each other, the first side surface 15 and the second side surface 16 are opposed to each other, and the first principal surface 17 and the second principal surface 18 are opposed to each other. In addition, the first side surface 15 and the second side surface 16 are perpendicular or substantially perpendicular to the first end surface 13 and the second end surface 14, and the first principal surface 17 and the second principal surface 18 are perpendicular or substantially perpendicular to the first end surface 13 and the first side surface 15. Further, as long as the laminated body 12 has a rectangular or substantially rectangular parallelepiped shape, corners and ridges thereof are preferably rounded or the like.

As shown in FIG. 2, the laminated body 12 includes first internal electrodes 22 provided at the interfaces between ceramic layers 20 defining inner layers, and second internal electrodes 24 opposed to the first internal electrodes 22 with the ceramic layers 20 interposed therebetween. The multiple combinations of the ceramic layers 20, first internal electrodes 22, and second internal electrodes 24 are stacked to define an inner layer portion 26. An outer layer portion 28 and an outer layer portion 30 sandwich the inner layer portion 26 from the laminating (T) direction. The outer layer portion 28 include a plurality of ceramic layers 46 defining outer layers, whereas the outer layer portion 30 includes a plurality of ceramic layers 48 defining outer layers. Side margin portions 32 and 34 sandwich the inner layer portion 26 and the outer layer portions 28, 30 from the width (W) direction. The side margin portions 32 and 34 include multiple ceramic layers defining side margins. In other words, the inner layer portion 26 is a region sandwiched between the first internal electrode 22b closest to the first principal surface 17 and the second internal electrode 24b closest to the second principal surface 18 in the laminating (T) direction. In addition, the side margin portions 32, 34 are regions where the first internal electrodes 22 and the second internal electrodes 24 are not present in a cross section of the laminated body 12 as viewed from the laminating (T) direction.

The multiple ceramic layers 20 defining inner layers are each sandwiched between the first internal electrode 22 and the second internal electrode 24. The ceramic layers 20 defining inner layers are composed of, for example, dielectric ceramic grains that contain, as their main constituent, a perovskite-type compound containing Ba and Ti, and have a perovskite structure. In addition to their main constituent, at least one of Si, Mg, and Ba may be added as an additive. The additive is present between the ceramic grains. The fired ceramic layers 20 defining inner layers preferably are about 0.2 μm or more and about 10 μm or less in thickness, for example.

For the laminated body 12, the ceramic layers 46, 48 defining the outer layer portions 28, 30 provided at the top and bottom of the body, are preferably made from the same dielectric ceramic material as the ceramic layers 20 defining inner layers. It is to be noted that the ceramic layers 46, 48 defining outer layers may be made of a material that is different from the ceramic layers 20 defining inner layers. In addition, when the ceramic layers 46, 48 defining outer layers each have a multilayer structure, as compared with Si segregation portions of the ceramic layers 46, 48 defining outer layers, located closest to the first and second internal electrodes 22b, 24b, the other ceramic layers 46, 48 defining outer layers preferably have more segregation portions. Thus, the deflecting strength is improved from the laminating (T) direction of the multilayer ceramic capacitor 10. It is to be noted that the fired outer layer portions 28, 30 preferably are about 15 μm or more and about 40 μm or less in thickness, for example. Further, the ceramic layers 46, 48 defining outer layers may each have a single-layer structure, rather than a multilayer structure.

The first internal electrodes 22 and the second internal electrodes 24 are opposed with the ceramic layers 20 defining inner layers interposed therebetween in the laminating (T) direction. Electrostatic capacitance is generated by the portions where the first internal electrodes 22 and the second internal electrodes 24 are opposed with the ceramic layers 20 defining inner layers interposed therebetween.

The ceramic layers 20 defining inner layers extend in the width (W) direction and the length (L) direction, and the multiple first internal electrodes 22 each extend in the form of a plate along the ceramic layers 20 defining inner layers. The multiple first internal electrodes 22 are each extended to the first end surface 13 of the laminated body 12, and electrically connected to the first external electrode 40. In addition, the multiple second internal electrodes 24 each extend in the form of a plate to be opposed to the first internal electrodes 22 with the ceramic layers 20 defining inner layers interposed therebetween.

The multiple second internal electrodes 24 are each extended to the second end surface 14 of the laminated body 12, and electrically connected to the second external electrode 42.

The first and second internal electrodes 22, 24 preferably are each, for example, about 0.3 μm or more and about 2.0 μm or less in thickness. The first and second internal electrodes 22, 24 preferably contain Ni.

It is to be noted that the electrodes can contain, besides Ni, metals such as Cu, Ag, Pd, an Ag—Pd alloy, and Au, for example. Further, the first and second internal electrodes 22, 24 may include the same dielectric grains as the ceramic layers 20 defining inner layers.

As shown in FIG. 4, Si is segregated at sites of the first and second internal electrodes 22, 24, including surfaces exposed most to the side margin portions 32, 34. The Si has segregation regions in the internal electrode domain at least within a range of about 0.5 μm or less from the side margin portions toward a central portion in the width (W) direction, and forms segregation portions 22a, 24a. In other words, the segregation portions 22a are provided at the first internal electrodes 22 close to the side margin portions 32, 34, whereas the segregation portions 24a are provided at the second internal electrodes close to the side margin portions 32, 34.

The segregation portions 22a, 24a improve the deflecting strength of the multilayer ceramic capacitor 10.

When the regions where the first internal electrodes 22 or the second internal electrodes 24 are not present are regarded as the side margin portions 32, 34 in a cross section of the laminated body 12 as viewed from the laminating (T) direction, the side margin portions 32, 34 have multiple side margin layers, the content of Si in the side margin layers closest to the internal electrodes 22, 24 is lower than that in the other side margin layers, and thus the strength of the side margin portions 32, 34 can be increased. Thus, the deflecting strength of the multilayer ceramic capacitor 10 is improved. Furthermore, the side margin portions 32, 34 are made less likely to be cracked or chipped, and ingress of water is thus prevented. Thus, insulation properties of the multilayer ceramic capacitor 10 are able to be ensured. As a result, the multilayer ceramic capacitor 10 achieves sufficient reliability.

In addition, the deflecting strength of the multilayer ceramic capacitor 10 is able to be further improved when the first internal electrodes 22 and second internal electrodes 24 of the laminated body 12 includes the segregation portions 22a, 24a close to the side margin portions 32, 34, with the segregation portions 22a, 24a containing Si. The side margin portions 32, 34 each have a multilayer structure including outer layers 32a, 34a located close to the first and second side surfaces 15, 16 of the laminated body 12, and inner layers 32b, 34b located close to the first and second internal electrodes 22, 24. It is to be noted that the multilayer structures of the side margin portions 32, 34 can be easily confirmed by observing the difference in sinterability between the outer layers 32a, 34a and the inner layers 32b, 34b with the use of an optical microscope.

The dimensions of the fired side margin portions 32, 34 in the width (W) direction are, for example, 5 μm or more and 40 μm or less. More preferably, the dimensions are 20 μm or less. In addition, the dimensions of the outer layers 32a, 34a in the width (W) direction are larger than the dimensions of the inner layers 32b, 34b in the width (W) direction. Specifically, the dimensions of the outer layers 32a, 34a in the width (W) direction are 5 μm or more and 20 μm or less. The dimensions of the inner layers 32b, 34b in the width (W) direction are 0.1 μm or more and 20 μm or less.

It is to be noted that the dimensions of the side margin portions 32, 34 in the width (W) direction in the invention mean average dimensions calculated from the result of measuring, at multiple points, the dimensions of the side margin portions 32, 34 in the laminating (T) direction. The measurement method is as follows. First, a surface (hereinafter, referred to as a "WT cross section") of the multilayer ceramic capacitor 10 is exposed which includes the width (W) direction and the laminating (T) direction. Next, images of the WT cross section are taken with an optical microscope such that ends of the first and second internal electrodes 22, 24 in the width (W) direction and one of the side margin portions 32, 34 are included in the same field of view. As for the imaging points, three points of upper, central, and lower parts are each imaged in the laminating (T) direction. Then, in each of the upper, central, and lower parts, multiple line segments parallel to the width (W) direction are drawn from the ends of the first and second internal electrodes 22, 24 in the width (W) direction toward the first and second side surfaces 15, 16, and the length of each line segment is measured. The average value for the lengths of the line segments measured as just described is calculated in each of upper, central, and lower parts. In addition, the respective average values are further averaged, thus providing the thickness dimensions of the side margin portions 32, 34.

The side margin portions 32, 34 are composed of, for example, a dielectric ceramic material including a perovskite structure composed of a main constituent such as $BaTiO_3$. Si is added as an additive to the main constituent, and between ceramic grains there are portions where the additive is segregated. The presence of the Si segregation portions improves the deflecting strength of the side margin portions 32, 34. Si is added to the outer layers 32a, 34a at the Si mole number/Ti mole number of 3.0 or more and 7.0 or less, and added to the inner layers 32b, 34b at the Si mole number/Ti mole number of 1.0 or more and 4.0 or less. In particular, there are more Si segregation portions in the outer layers 32a, 34a than in the inner layers 32b, 34b.

Figure 5:
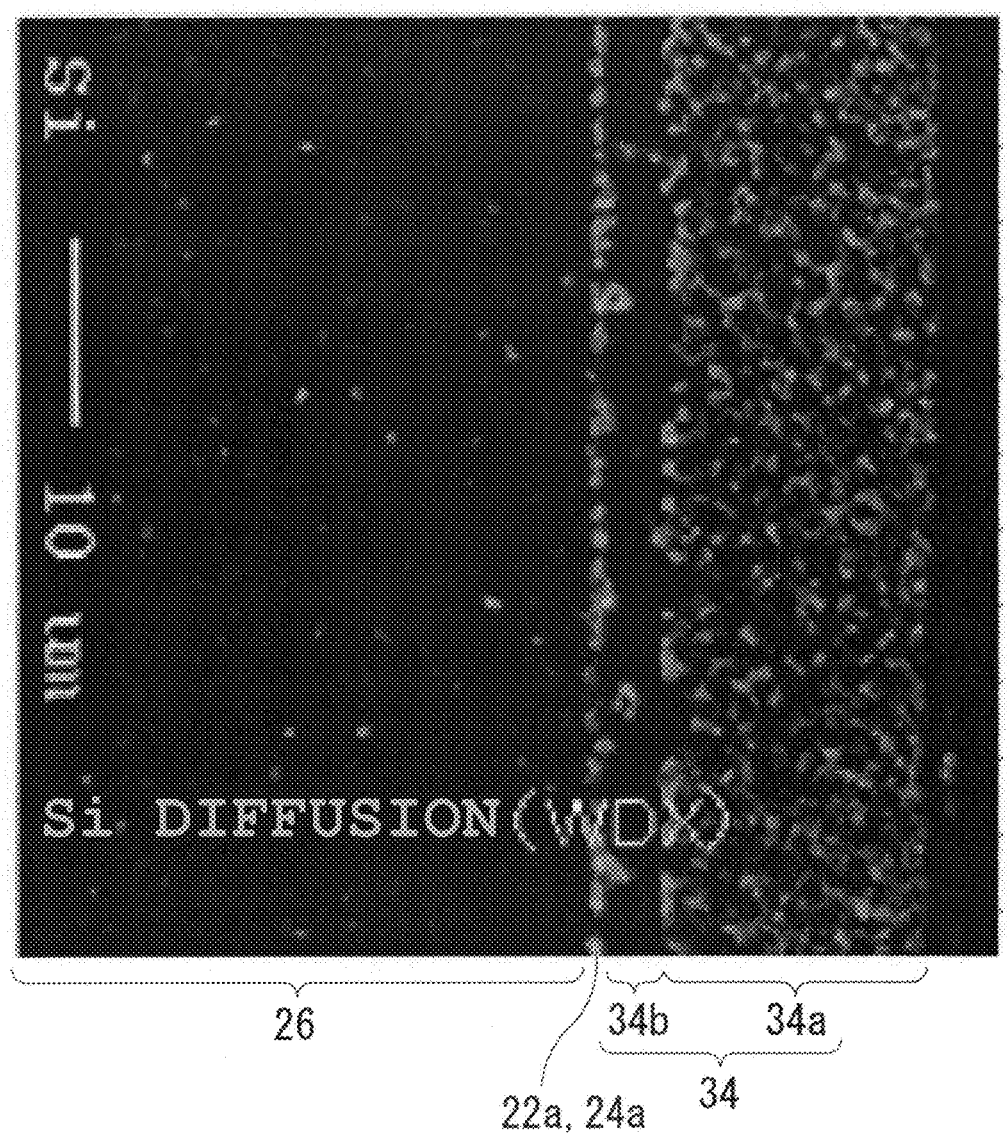
FIG. 5 is a diagram of an image taken by WDX, of Si segregation portions of a side margin portion included in the multilayer ceramic capacitor according to a multilayer ceramic capacitor according to a preferred embodiment of the present invention.
Figure 6:
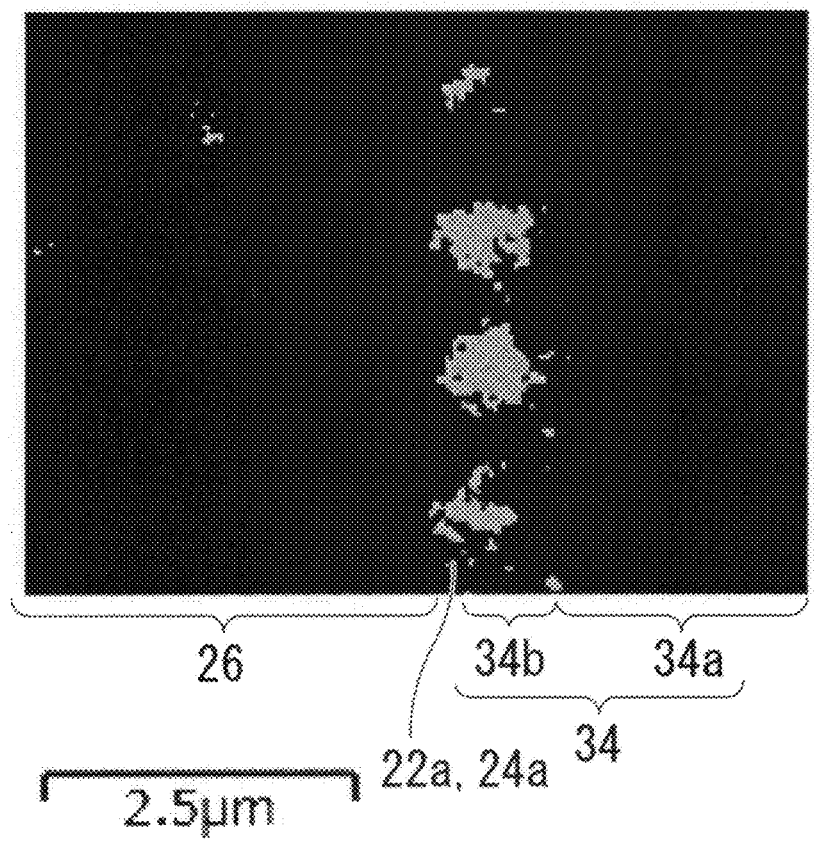
FIG. 6 is a diagram of an image taken by a WDS, of Mg segregation portions in the vicinity of the surface of a side margin portion included in the multilayer ceramic capacitor according to a preferred embodiment of the present invention.
Figure 7:
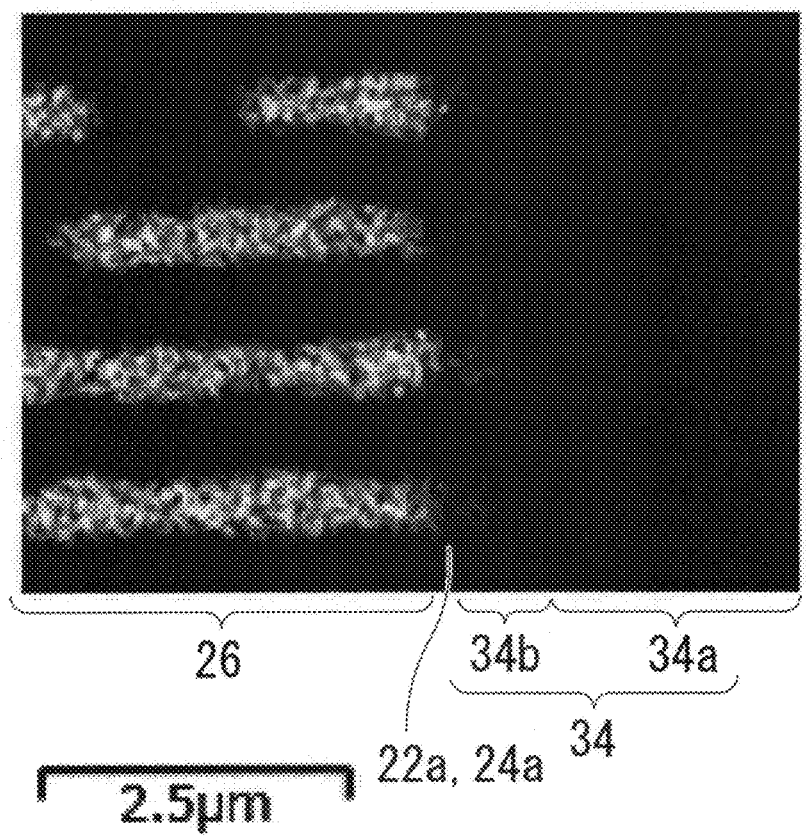
FIG. 7 is a diagram of an image taken by a WDS, of Ni segregation portions in the vicinity of the surface of a side margin portion included in a preferred embodiment of the present invention.
Figure 8:
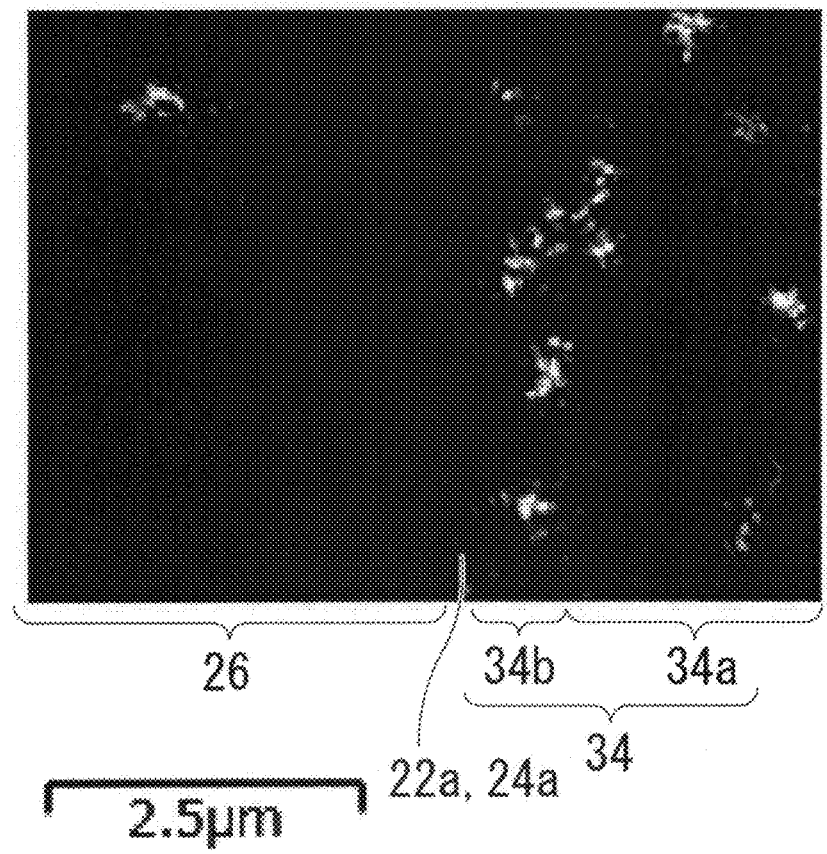
FIG. 8 is a diagram of an image taken by a WDS, of Si segregation portions in the vicinity of the surface of a side margin portion included in a preferred embodiment of the present invention.

FIG. 5 is a diagram of an image taken by a wavelength dispersive X-ray spectrometer (hereinafter, referred to as WDX), of Si segregation portions of the side margin portion included in the multilayer ceramic capacitor 10. The Si segregation portions of the side margin portions 32, 34 can be confirmed by exposing a WT cross section substantially in the center of the laminated body 12 in the length (L) direction, and then observing the section with the use of a WDX. Furthermore, it can be confirmed that the Si segregation portions 22a, 24a are formed at the first and second internal electrodes 22, 24 closest to the side margin portions 32, 34. It is to be noted that the segregation of not only Si but also Mg is also confirmed. FIGS. 6 to 8 are diagrams of images take by a WDS, of the same site (in the vicinity near the surface of the side margin portion) of the multilayer ceramic capacitor 10, where FIG. 6 is a diagram of an image of a Mg segregation portion, FIG. 7 is a diagram of an image of a Ni segregation portion, and FIG. 8 is a diagram of an image of an Si segregation portion.

The amounts of Ba as an additive between ceramic grains for each of the ceramic layers 20 defining inner layers, the outer layers 32a, 34a, and the inner layers 32b, 34b are: ceramic layers for inner layers 20<outer layers 32a, 34a<inner layers 32b, 34b.

As just described, the content of Ba between ceramic grains varies with each of the ceramic layers 20 defining inner layers, the outer layers 32a, 34a, and the inner layers 32b, 34b. It is to be noted that the differences in Ba content can be found by TEM analysis.

In addition, the contents of Ba in the inner layer portion 26 and the outer layers 32a, 34a and inner layers 32b 34b of the side margin portions 32, 34 are prepared such that in terms of molar ratio as a center value with respect to 1 mol of Ti, the outer layers 32a, 34a is higher than 1.01 and 1.020 or lower; the inner layers 32b, 34n are higher than 1.020 and lower than 1.040; and the inner layer portion 26 is higher than 0.99 and lower than 1.01.

Here is a method for confirming the molar ratios mentioned above. First, the outer layers 32a, 34a, and inner layers 32b, 34b in the side margin portions 32, 34 of the laminated body 12 are polished from the side margin portions 32, 34. Next, the powders of the outer layers 32a, 34a and inner layers 32b, 34b, which are obtained by the polishing, are each dissolved with an acid. Then, ICP emission spectrometry can confirm whether the outer layers 32a, 34a and the inner layers 32b, 34b have the molar ratios mentioned above.

The content of Ba added between ceramic grains of the inner layers 32b, 34b is higher in the range in excess of 100% and less than 140% with respect to the content of Ba between ceramic grains of the outer layers 32a, 34a.

In addition, the side margin portions 32, 34 are formed such that void portions are reduced from the internal electrode side toward the side surface side. More specifically, there are fewer void portions in the outer layers 32a, 34a than in the inner layers 32b, 34b. Thus, ingress of water is suppressed from the side margin portions 32, 34 into the laminated body 12, and the moisture resistance of the multilayer ceramic capacitor 10 can be thus improved. Furthermore, insulation properties of the multilayer ceramic capacitor 10 can be ensured.

The first external electrode 40 is covers the first end surface 13 of the laminated body 12, and is electrically connected to the first internal electrode 22 extended to the first end surface 13 of the laminated body 12. In addition, the second external electrode 42 covers the second end surface 14 of the laminated body 12, and is electrically connected to the second internal electrode 24 extended to the second end surface 14 of the laminated body 12.

As shown in FIGS. 1 and 2, the first external electrode 40 has a three-layer structure including a base electrode layer 40a, lower-layer plating 40b formed on the surface of the base electrode layer 40a, and upper layer plating 40c formed on the surface of the lower-layer plating 40b. The base electrode layer 40a is provided to entirely cover the first end surface 13 of the laminated body 12, and also provided to cover, from the portion Covering the end surface 13, portions of the respective first side surface 15 and second side surface 16 as well as portions of the respective first principal surface 17 and second principal surface 18.

As shown in FIGS. 1 and 2, the second external electrode 42 has a three-layer structure including a base electrode layer 42a, lower-layer plating 42b formed on the surface of the base electrode layer 42a, and upper layer plating 42c formed on the surface of the lower-layer plating 42b. The base electrode layer 42a is provided to entirely cover the second end surface 14 of the laminated body 12, and also provided to cover, from the portion Covering the end surface 14, portions of the respective first side surface 15 and second side surface 16 as well as portions of the respective first principal surface 17 and second principal surface 18.

The base electrode layers 40a, 42a preferably contains Cu formed by baking.

Further, the layers may contain, for example, Ni, Ag, Pd, a Ag—Pd alloy, or Au, besides Cu. In addition, the base electrode layers 40a, 42a may have multiple layers. It is to be noted that the base electrode layers 40a, 42a may be formed by firing simultaneously with the first internal electrodes 22 and the second internal electrodes 24, so-called co-firing, or formed by applying and baking a conductive paste, so-called post-firing. Alternatively, the base electrode layers 40a, 42a may be formed directly by plating, or formed by curing a resin layer including conductive grains and a thermosetting resin.

The lower layer platings 40b, 42b preferably contain Ni for preventing solder leaching. In addition, the upper layer platings 40c, 42c preferably contain Sn for enhancing mountability. Further, the lower layer platings 40b, 42b can contain, besides Ni, or the upper layer platings 40c, 42c can contain, besides Sn, for example, Cu, Ag, Pd, an Ag—Pd alloy, or Au. Further, a conductive resin layer for stress relaxation may be formed between the base electrode layer 40a and the lower layer plating 40b and between the base electrode layer 42a and the lower layer plating 42b. Alternatively, through plating directly onto the laminated body 12, the first and second external electrodes 40, 42 may be formed by the plating.

It is to be noted that in the case of direct plating as the external electrodes 40, 42, and in the case of using Ni as the first and second internal electrodes 22, 24, it is preferable to use, as the lower layer platings 40b, 42b, Cu which is favorably joined with Ni. Furthermore, the upper layer platings 40c, 42c preferably have two-layer structures including first upper plating layers formed on the surfaces of the lower layer platings 40b, 42b, and second upper plating layers formed on the surfaces of the first upper plating layers. The first upper plating layers preferably contain Ni that has the function of preventing solder leaching. The second upper plating layers preferably contain Sn or Au that has favorable solderability.

As shown in FIG. 3, the side margin portions 32, 34 of the multilayer ceramic capacitor 10 according to this preferred embodiment preferably include multiple layers. The side margin portion 32 includes the outer layer 32a and the inner layer 32b. The inner layer 32b is disposed between the first and second internal electrodes 22, 24 and the outer layer 32a. The content of Si in the outer layer 32a which is a side margin layer other than the inner layer 32b is higher than that in the inner layer 32b disposed closest to the first and second internal electrodes 22, 24. The side margin portion 34 includes the outer layer 34a and the inner layer 34b. The inner layer 34b is disposed between the first and second internal electrodes 22, 24 and the outer layer. The content of Si in the outer layer 34a which is a side margin layer other than the inner layer 34b is higher than that in the inner layer 34b disposed closest to the first and second internal electrodes 22, 24. Thus, the strength of the side margin portions 32, 34 is improved, and the deflecting strength of the multilayer ceramic capacitor 10 is thus improved. Furthermore, the side margin portions 32, 34 are made less likely to be cracked or chipped, ingress of water is thus prevented, and insulation properties of the multilayer ceramic capacitor 10 are thus ensured. As a result, the multilayer ceramic capacitor 10 is able to be provided which reliability improved reliability. In addition, there are interfaces between the outer layers 32a, 34a and the inner layers 32b, 34b, and these interfaces relax stress applied onto the multilayer ceramic capacitor 10.

In addition, in the multilayer ceramic capacitor 10 according to this preferred embodiment, the surfaces closest to the side margin portions 32, 34 contain more Si than central portions of the first and second internal electrodes 22, 24. As a result, the strength of the side margin portions 32, 34 is further improved.

Furthermore, the contents of Si in the side margin portions 32, 34 of the multilayer ceramic capacitor 10 according to this preferred embodiment preferably is about 1.0 or more and about 7.0 or less in Si molar number/Ti molar number calculated. When the Si molar number/Ti molar number is less than about 1.0, the side margin portions 32, 34 are insufficiently sintered, thus increasing the porosity, and fail to achieve sufficient improvement in deflecting strength.

On the other hand, when the Si molar number/Ti molar number exceeds about 7.0, Si excessively diffuses into the internal electrodes, thus resulting in over-sintering, and decreasing reliability such as an insulation resistance value.

Furthermore, in the multilayer ceramic capacitor 10 according to this preferred embodiment, the side margin portions 32, 34 preferably have dimensions of about 5 μm or more and about 40 μm or less in the width direction of the laminated body 12, for example.

When the side margin portions 32, 34 exceed about 40 μm make it impossible to ensure required capacitance.

When the side margin portions 32, 34 are less than about 5 μm, the side margin portions 32, 34 are insufficiently sintered, thus failing to obtain the dense side margin portions 32, 34. When the side margin portions are not dense, water ingress from the outside is easily caused.

Figure 9A:
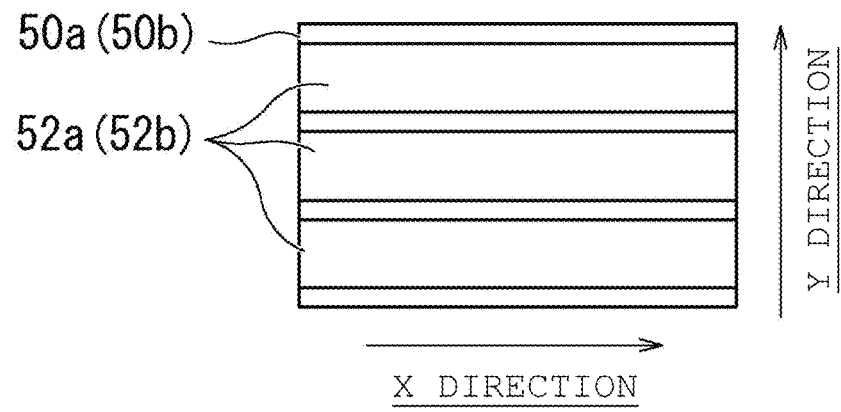
FIGS. 9A and 9B are diagrams for explaining a method for manufacturing a multilayer ceramic capacitor according to a preferred embodiment of the present invention, where
Figure 9B:
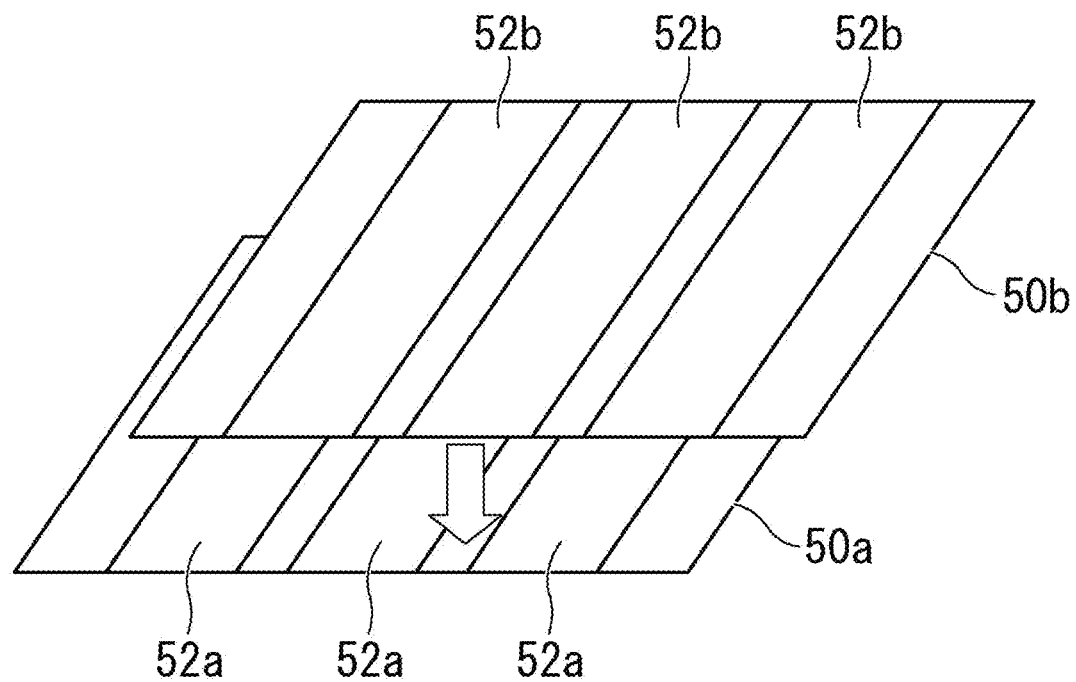
Figure 10:
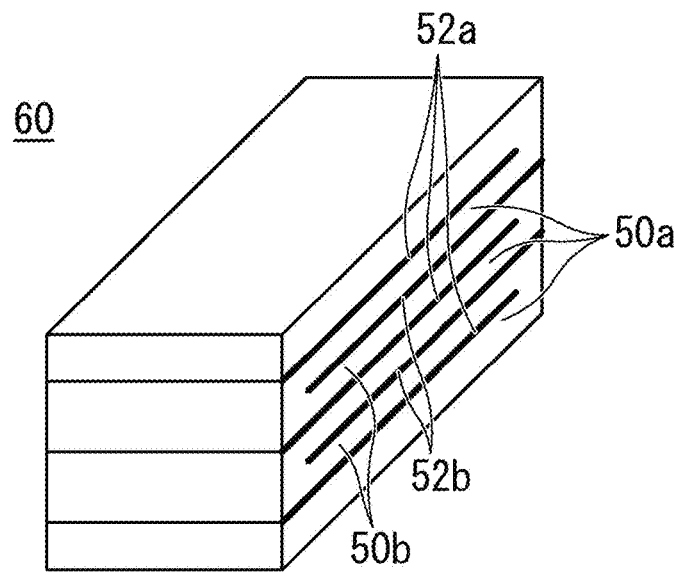
FIG. 10 is a perspective view illustrating an example of the appearance of a laminated body chip obtained by the method for manufacturing a multilayer ceramic capacitor according to a preferred embodiment of the present invention.

Subsequently, a non-limiting example of a method for manufacturing the multilayer ceramic capacitor will be described. FIGS. 9A and 9B are diagrams for explaining a non-limiting example of method for manufacturing the multilayer ceramic capacitor according to this preferred embodiment, where FIG. 9A is a schematic view illustrating ceramic green sheets with conductive films formed, and FIG. 9B is a pattern diagram illustrating the stacked ceramic green sheets with the conductive films formed. FIG. 10 is a perspective view illustrating a preferred embodiment of the appearance of a laminated body chip obtained by the method for manufacturing the multilayer ceramic capacitor according to this preferred embodiment.

First, a perovskite-type compound containing Ba and Ti is prepared as a dielectric ceramic material. The dielectric powder obtained from the dielectric ceramic material is mixed with at least one of Si, Mg, and Ba as an additive, as well as an organic binder, an organic solvent, a plasticizer, and a dispersant in a predetermined proportion, thus preparing a ceramic slurry. The ceramic slurry is formed into ceramic green sheets 50a and 50b on the surfaces of multiple resin films (not shown). The ceramic green sheets 50b are stacked alternately with the ceramic green sheet 50a, and the ceramic green sheets 50a (50b) are formed with the use of, for example, a die coater, a gravure coater, and a microgravure coater.

Next, as shown in FIG. 9A, onto the surfaces of the ceramic green sheets 50a (50b), a conductive paste to form internal electrodes is applied in the form of stripes in an X direction, and dried. It is to be noted that the direction in which the conductive paste to form internal electrodes extends in the form of stripes is hereinafter referred to as the X direction. In addition, the width direction of conductive films 52a, 52b is referred to as a Y direction. In this way, the conductive films 52a (52b) are formed to define and function as the first internal electrodes 22 (second internal electrodes 24). For the printing method, various types of methods can be used, such as screen printing, ink-jet printing, and gravure printing. The conductive films 52a, 52b preferably are, for example, about 1.5 μm or less in thickness.

First, a predetermined number of ceramic green sheets with no conductive film formed is stacked, which defines and functions as the outer layer portion 28, and next, as shown in FIG. 9B, the multiple ceramic green sheets 50a, 50b with the conductive films 52a, 52b applied are shifted in the Y direction, and stacked to define and function as the inner layer portion 26. Furthermore, on the inner layer portion 26, a predetermined number of ceramic green sheets with no conductive film formed is stacked, which defines and functions as the outer layer portion 30, thus providing a mother stacked body.

Next, the obtained mother stacked body is pressed. Methods such as rigid pressing and isostatic pressing can be used as the method for pressing the mother stacked body.

Next, the pressed mother stacked body is cut into a chip shape, thus providing a stacked body chip 60 as shown in FIG. 10. Various types of methods such as push-cutting, dicing, and laser can be used as the method for cutting the mother stacked body.

As shown in FIG. 10, only the conductive films 52a of the ceramic green sheets 50a are exposed at one end surface of the stacked body chip 60 obtained through the foregoing steps. In addition, only the conductive films 52b of the ceramic green sheets 50b are exposed at the other end surface.

In addition, the conductive film 52a of the ceramic green sheets 50a and the conductive films 52b of the ceramic green sheets 50b are exposed respectively at both side surfaces of the stacked body chip 60.

Subsequently, the procedure will be described for preparing ceramic green sheets for side margins to define and function as the side margin portions 32, 34.

First, a perovskite-type compound containing Ba and Ti is prepared as a dielectric ceramic material. The dielectric powder obtained from the dielectric ceramic material is mixed with at least one of Si, Mg, and Ba as an additive, as well as a binder resin, an organic solvent, a plasticizer, and a dispersant in predetermined proportion, thus preparing ceramic slurry.

In this regard, Si is added to the ceramic slurry to define and function as the outer layer 32a of the side margin portion 32 (and the outer layer 34a of the side margin portion 34). Specifically, Si is added such that the Si mole number/Ti mole number is about 1.0 or more and about 7.0 or less, for example. In addition, Si is also added to the ceramic slurry to define and function as the inner layer 32b of the side margin portion 32 (and the inner layer 34b of the side margin portion 34). Specifically, Si is added such that the Si mole number/Ti mole number is about 1.0 or more and about 4.0 or less, for example.

In addition, Ba is added to the ceramic slurry to define and function as the outer layer 32a of the side margin portion 32 (and the outer layer 34a of the side margin portion 34). Specifically, Ba is added such that the Ba mole number/Ti mole number is about 0.00 or more and less than about 0.02, for example.

In addition, Ba is also added to the ceramic slurry to define and function as the inner layer 32b of the side margin portion 32 (and the inner layer 34b of the side margin portion 34). Specifically, Ba is added such that the Ba mole number/Ti mole number is about 0.02 or more and less than about 0.04, for example.

Furthermore, the amount of PVC that is polyvinyl chloride contained in the ceramic slurry to define and function as the outer layers 32a, 34a of the side margin portions 32, 34 is higher than the amount of polyvinyl chloride (PVC) contained in the ceramic slurry to define and function as the inner layers 32b, 34b of the side margin portions 32, 34.

Furthermore, as the solvent contained in the ceramic slurry to define and function as the inner layers 32b, 34b of the side margin portions 32, 34, an optimum solvent is selected appropriately to prevent the dissolution of the ceramic green sheets for outer layers. In addition, the ceramic green sheets for inner layers have a role for adhesion to the stacked body chip 60.

Then, the prepared ceramic slurry to define and function as the outer layers 32a, 34a is applied onto the surface of the resin films, and dried, thus providing ceramic green sheets for outer layers.

Next, the prepared ceramic slurry to define and function as the inner layers 32b, 34b is applied onto the surface of the ceramic green sheets for outer layers, and dried, thus forming ceramic green sheets for inner layers. In the way described above, the ceramic green sheets are obtained for side margins that have a two-layer structure.

In this regard, the dimension in the width direction of the ceramic green sheets for inner layers is preferably smaller than the dimension in the width direction of the ceramic green sheets for outer layers. Specifically, for example, as for the thickness after firing, the ceramic green sheets for outer layers preferably are formed to be about 5 μm or more and about 20 μm or less, and the ceramic green sheets for inner layers preferably are formed to be about 0.1 μm or more and about 20 μm or less.

It is to be noted that a case has been described above, where the ceramic green sheets for side margins of two-layer structure are obtained by applying the ceramic green sheets for inner layers onto the surfaces of the ceramic green sheets for outer layers, and drying the sheets. However, the present invention is not limited to this case, ceramic green sheets for outer layers and ceramic green sheets for inner layers may be each formed in advance, and then bonded to each other, thus providing ceramic green sheets for side margins of two-layer structure. It is to be noted that the ceramic green sheets for side margins are not limited to two layers, but may have three or more multiple layers.

Next, the ceramic green sheets for side margins are peeled from the resin film.

Subsequently, the ceramic green sheet for inner layers from the peeled ceramic green sheets for side margins is opposed to and pressed against the side surface of the stacked body chip at which the conductive films 52a, 52b are exposed, and subjected to punching, thus forming a layer to define and function as the side margin portion 32. Furthermore, for the side surface of the stacked body chip 60 on which a layer is not formed to define and function as the side margin portion 32, the ceramic green sheet for inner layers is opposed to and pressed against the side surface of the stacked body chip 60 at which the conductive films 52a, 52b are exposed, and subjected to punching, thus forming a layer to define and function as the side margin portion 34. In this case, it is preferable to apply an organic solvent as an adhesive in advance to the side surfaces of the stacked body chip 60.

Next, the stacked body chip 60 with the layers formed to define and function as the side margin portions 32, 34 is subjected to a degreasing treatment under a predetermined condition in a nitrogen atmosphere, and then subjected to firing at a predetermined temperature in a mixed atmosphere of nitrogen-hydrogen-water vapor, thus providing the sintered laminated body 12.

Next, an external electrode paste containing Cu as its main constituent is applied to each of two end surfaces of the sintered laminated body 12, and baked to form the base electrode 40a connected to the first internal electrode 22 and the base electrode 42a connected to the second internal electrodes. Furthermore, on the surfaces of the base electrode layers 40a, 42a, the lower layer platings 40b, 42b are formed by Ni plating, and on the surfaces of the lower layer platings 40b, 42b, the upper layer platings 40c, 42c are formed by Sn plating, thus forming the first and second external electrodes 40, 42.

In the way described above, the multilayer ceramic capacitor 10 is manufactured as shown in FIG. 1.

It is to be noted that the side margin portions 32, 34 may be formed by applying ceramic slurry for side margins to the both side surfaces of the stacked body chip 60 at which the conductive films 52a, 52b are exposed.

More specifically, ceramic slurry to define and function as the inner layers 32b, 34b is applied to the both side surfaces of the stacked body chip 60 at which the conductive films 52a, 52b are exposed, and dried. Furthermore, ceramic slurry to define and function as the outer layers 32a, 34a is applied to the surfaces of the inner layers 32b, 34b.

In this case, the thickness for each ceramic slurry to define and function as the outer layers 32a, 34a and the inner layers 32b, 34b is able to be adjusted by changing the amount of the resin included in each ceramic slurry.

In addition, the side margin portions 32, 34 may be formed by, with the both end surfaces of the stacked body chip 60 masked with a resin or the like, dipping the whole stacked body chip 60 in the ceramic slurry to define and function as the inner layers 32b, 34b, drying the chip, and further dipping the chip in the ceramic slurry to define and function as the outer layers 32a, 34a. In this case, the inner layers and the outer layers are formed on the outer layer portions 28, 30, thus forming three-layer structures.

An experimental example will be described below. In the experimental example, respective samples of multilayer ceramic capacitors according to the following example and comparative example were produced, and evaluated by measuring the hardness at side margin portion surfaces of the multilayer ceramic capacitors with a Vickers hardness tester.

Example

First, in the example, the sample of the multilayer ceramic capacitor shown in FIG. 1 was produced by the method mentioned above. In this case, the external dimensions of the multilayer ceramic capacitor were made about 1.0 mm in length, about 0.5 mm in width, and about 0.5 mm in height, for example. In the example, prepared was the multilayer ceramic capacitor including side margin portions of two-layer structure composed of an inner layer containing Si at a Si mole number/Ti mole number of about 3.5 with respect to Ti and an outer layer containing Si at a Si mole number/Ti mole number of about 5 with respect to Ti. In addition, the thickness of the side margin portion was made about 20 μm. It is to be noted that for the side margin portion according to the example, the thickness of the outer layer was made about 16 μm, and the thickness of the inner layer was made about 4 μm.

Comparative Example

In the comparative example, the multilayer ceramic capacitor was produced under the same conditions as in the example, except that side margin portions of one-layer structure containing Si at a Si mole number/Ti mole number of 3.5 with respect to Ti were adopted without the side margin portions composed of the two layers of the inner layer and the outer layer.

Evaluation Method

Five multilayer ceramic capacitors were prepared for each sample of the multilayer ceramic capacitors according to the example and comparative example described above, and the hardness of the side margin portion surface was measured with a Vickers hardness tester at both side surfaces of the multilayer ceramic capacitors. The conditions for the measurement of the Vickers hardness were the measurement weight: 200 gf and the holding time at a bottom dead point: 10 s. In addition, the pore area ratio in the vicinity of the side margin portion surface was calculated for each sample of the multilayer ceramic capacitors according to the example and the comparative example. For the pore area ratio, the surface including the side margin portion is exposed, and an image of the surface is taken with a SEM. The image taken is subjected to image processing to measure the pore area. The pore area divided by the area of the multilayer ceramic capacitor in the image taken is calculated as the pore area ratio.

Figure 11:
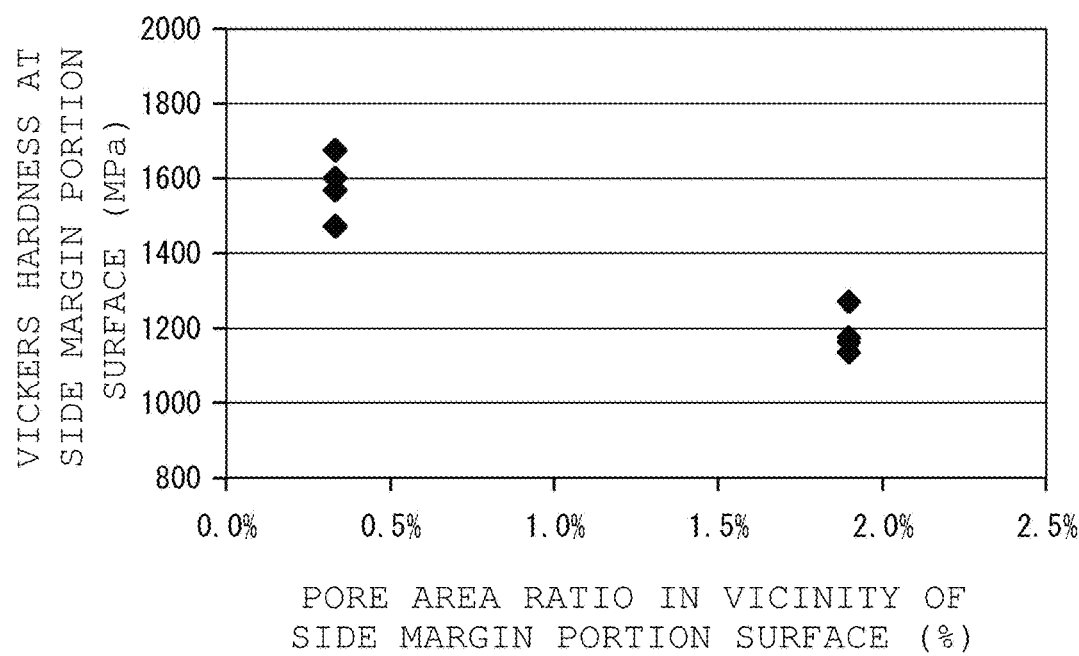
FIG. 11 is a diagram showing the relationship between the pore area ratio in the vicinity of the side margin portion surface and the Vickers hardness at the side margin portion surface.

FIG. 11 is a diagram showing the relationship between the pore area ratio in the vicinity of the side margin portion surface and the Vickers hardness at the side margin portion surface.

As a result of the experiment, as shown in FIG. 11, in the case of the multilayer ceramic capacitor according to the example of a preferred embodiment of the present invention, the pore area ratio was about 0.3% around the side margin portion surface, and the Vickers hardness was about 1470 MPa or more and 1680 MPa or less at the side margin portion surface, for example.

On the other hand, as shown in FIG. 11, in the case of the multilayer ceramic capacitor according to the comparative example, the pore area ratio was 1.9% around the side margin portion surface, and the Vickers hardness was 1140 MPa or more and 1270 MPa or less at the side margin portion surface.

From the foregoing, it has been demonstrated that a multilayer ceramic capacitor according to an example of a preferred embodiment of the present invention has deflecting strength improved more than the multilayer ceramic capacitor according to the comparative example.

It is to be noted that the present invention is not limited to the preferred embodiments described above, but various modifications can be made within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a laminated body including a plurality of dielectric layers and a plurality of internal electrodes laminated in a laminating direction; and
   a plurality of external electrodes electrically connected to respective ones of the plurality of internal electrodes; wherein
   the laminated body includes a first principal surface and a second principal surface opposed in the laminating direction, a first side surface and a second side surface opposed in a width direction perpendicular or substantially perpendicular to the laminating direction, and a first end surface and a second end surface opposed in a length direction perpendicular or substantially perpendicular to both the laminating direction and the width direction;

the plurality of internal electrodes includes first internal electrodes exposed at the first end surface, and second internal electrodes exposed at the second end surface;

the laminated body includes outer layer portions provided at a top and a bottom of the laminated body in the laminating direction, and an inner layer portion provided between the outer layer portions;

the plurality of external electrodes includes a first external electrode covering the first end surface and electrically connected to the first internal electrodes, and a second external electrode covering the second end surface and connected to the second internal electrodes;

side margin portions sandwich the plurality of dielectric layers in the width direction;

in the width direction from a respective one of the first and second side surfaces to the plurality of the dielectric layers, each of the side margin portions includes at least one outer side margin layer and at least one inner side margin layer in that order, the at least one outer side margin layer being located closer to the respective one of the first and second side surfaces than the at least one inner side margin layer, and the at least one inner side margin layer being located closer to the plurality of internal electrodes than the at least one outer side margin layer; and a pore ratio of the at least one inner side margin layer is different from a pore ratio of the at least one outer side margin layer.

2. The multilayer ceramic capacitor according to claim 1, wherein a thickness of the at least one inner side margin layers is less than a total thickness of at least one of the outer layer portions.

3. The multilayer ceramic capacitor according to claim 2, wherein the total thickness of the at least one of the outer layer portions is about 15 µm or more and about 40 µm or less.

4. The multilayer ceramic capacitor according to claim 1, wherein the side margin portions have a Si mole number/Ti mole number of about 1.0 or more and about 7.0 or less.

5. The multilayer ceramic capacitor according to claim 1, wherein the side margin portions have a dimension of about 5 µm or more and about 40 µm or less in the width direction.

6. The multilayer ceramic capacitor according to claim 1, wherein the plurality of dielectric layers define inner layers of the laminated body that include dielectric ceramic grains containing a perovskite compound including Ba and Ti and a perovskite structure.

7. The multilayer ceramic capacitor according to claim 6, wherein a thickness of at least one of the inner layers is about 0.2 µm or more and about 10 µm or less.

8. The multilayer ceramic capacitor according to claim 6, wherein an additive including at least one of Si, Mg, and Ba is provided between the ceramic grains.

9. The multilayer ceramic capacitor according to claim 1, wherein the laminated body has a rectangular or substantially rectangular parallelepiped shape.

10. The multilayer ceramic capacitor according to claim 1, wherein the plurality of dielectric layers define outer layers of the laminated body that include dielectric ceramic grains containing a perovskite compound including Ba and Ti and a perovskite structure.

11. The multilayer ceramic capacitor according to claim 1, wherein each of the plurality of internal electrodes has a thickness of about 0.3 µm or more and about 2.0 µm or less.

12. The multilayer ceramic capacitor according to claim 1, wherein the plurality of dielectric layers define outer layers of the laminated body that are made of a material that is different from a material of inner layers of the laminated body that are defined by the plurality of dielectric layers.

13. The multilayer ceramic capacitor according to claim 1, wherein Si is included at locations of the first and second internal electrodes.

14. The multilayer ceramic capacitor according to claim 1, wherein Si is included at segregation regions at least within a range of about 0.5 µm or less from the side margin portions toward a central portion in the width direction to define segregation portions.

15. The multilayer ceramic capacitor according to claim 1, wherein the side margin portions include a dielectric ceramic material including a perovskite structure.

16. The multilayer ceramic capacitor according to claim 1, wherein each of the at least one outer side margin layers has a Si mole number/Ti mole number of about 3.0 or more and about 7.0 or less, and each of the at least one inner side margin layers has a Si mole number/Ti mole number of about 1.0 or more and about 4.0 or less.

17. The multilayer ceramic capacitor according to claim 1, wherein the at least one outer side margin layers contain less void portions than the at least one inner side margin layers.

18. The multilayer ceramic capacitor according to claim 1, wherein each of the first and second external electrodes has a multilayer structure.

19. The multilayer ceramic capacitor according to claim 1, wherein Si is included in regions of the laminated body that are adjacent to outer edges of the plurality of internal electrodes in the width direction.

20. The multilayer ceramic capacitor according to claim 19, wherein adjacent ones of the regions of the laminated body including the Si are spaced from each other in the lamination direction by a respective one of the plurality of dielectric layers.

21. The multilayer ceramic capacitor according to claim 19, wherein the Si is located between the outer edges of the plurality of internal electrodes and each of the at least one inner side margin layers in the width direction.

* * * * *